Jan. 28, 1930. S. SMITH 1,745,033
SHOCK ABSORBER
Filed Jan. 9, 1928 2 Sheets-Sheet 1
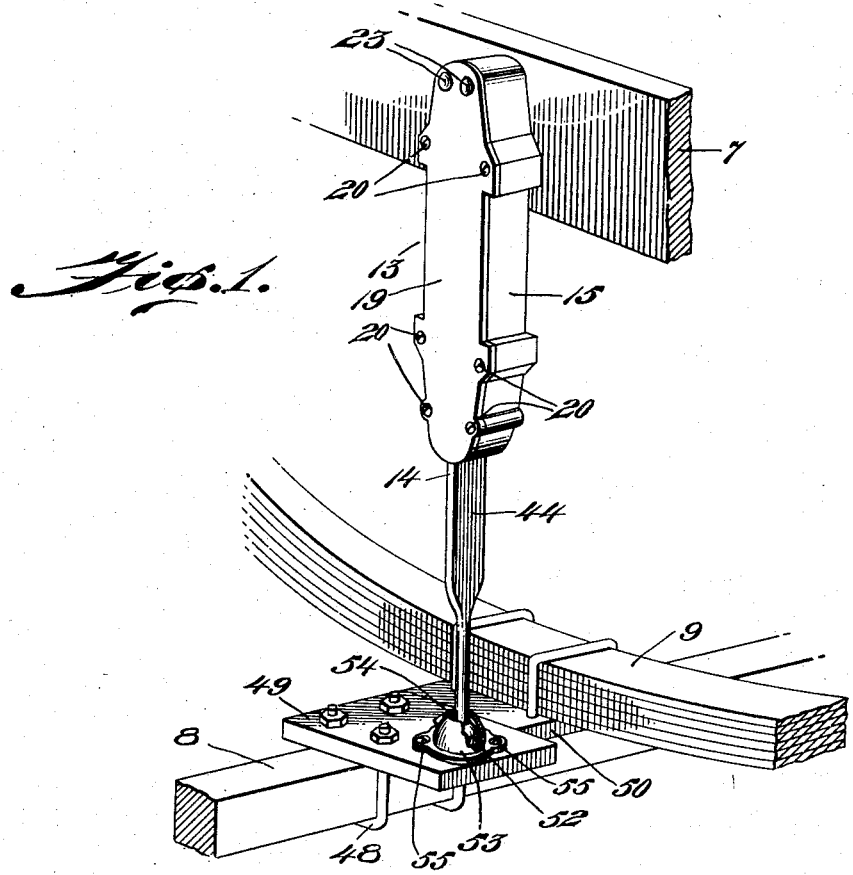
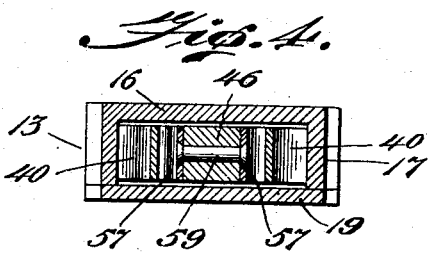
Inventor
Sheffield Smith
By Horatio E. Bellows
Attorney Jan. 28, 1930.  S. SMITH  1,745,033
SHOCK ABSORBER
Filed Jan. 9, 1928  2 Sheets-Sheet 2
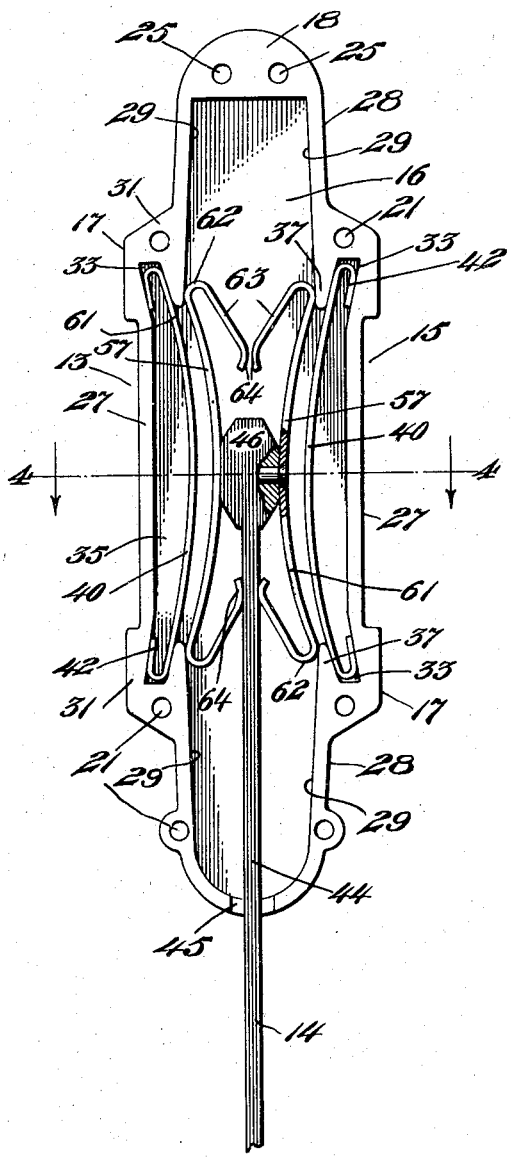
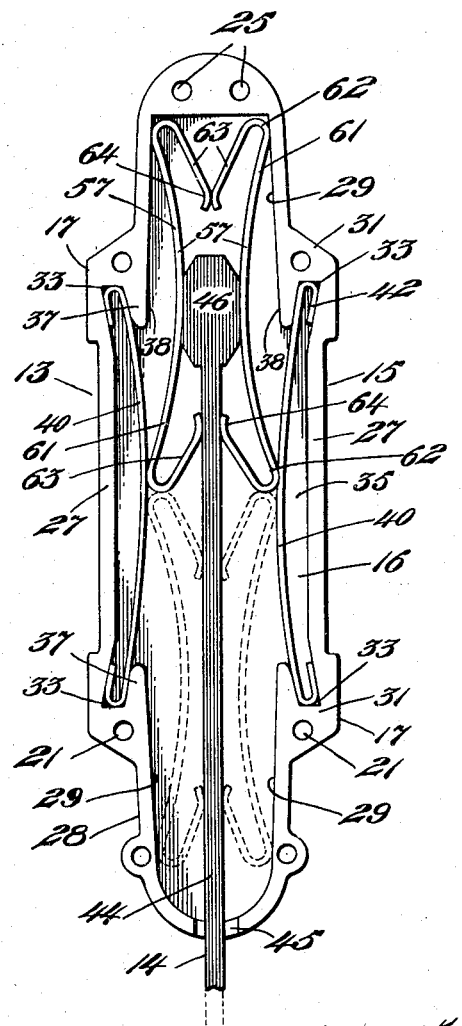
Inventor
Sheffield Smith
By Horatio E. Bellows
Attorney Patented Jan. 28, 1930

1,745,033

UNITED STATES PATENT OFFICE

SHEFFIELD SMITH, OF NORTH PROVIDENCE, RHODE ISLAND

SHOCK ABSORBER

Application filed January 9, 1928. Serial No. 245,396.

My invention relates to shock absorbers adapted for use upon vehicles of all kinds.

The essential objects of my invention are to efficiently cushion and shock in both an upward and downward direction; to gradually intensify the degree of resistance to the shock as the body and axle of the vehicle approach the limits of their travel towards or from each other; to extensively distribute the shock occasioned by any road inequality and completely absorb the same; to maintain the constituent parts under continuous tension; to combine a maximum of strength with a minimum of weight; to conserve space; and attain these ends in a simple and inexpensive structure.

To the above ends essentially my invention consists in such parts and in such combinations of parts as fall within the scope of the appended claims.

In the accompanying drawings which form a part of this specification

Figure 1 is a perspective view of my device applied to a vehicle,

Figure 2, a fragmentary front view of my device with the front of the casing removed showing the parts in neutral position, Figure 3, a similar view of the same showing the portions of the parts in one extreme of their travel, and Figure 4, a transverse section taken on line 4—4 of Figure 2.

Like reference characters indicate like parts throughout the views.

As herein shown 7 and 8 designate the frame and axle of a vehicle of any usual or preferred form, and 9 any usual vehicle spring associated with the axle and frame.

My device, which is capable of attachment to the described or other vehicle, comprises relatively movable members or parts 13 and 14. The former is associated with the frame, and the latter, with the axle or vehicle spring.

As herein shown the member 13 is a casting in the form of an oblong casing 15 comprising a back 16, sides 17, ends 18, and a detachable front 19 attached in this instance by screws 20 entering threaded openings 21 in the ends and sides respectively. Bolts or screws 23 extending through transverse holes 25 in the top of the casing fix the latter to the frame 7. The sides 17 have offset rectangular intermediate portions or extensions 27 parallel with each other, and tapering portions 28 above and below the intermediate portions, embodying internal inclined, converging, bearing faces 29. The ends 31 of the extensions 27 are of greater thickness than the remainder of the sides and are provided with oppositely disposed inclined, vertical cavities 33, each pair of cavities open into an oblong recess 35 in the side wall, and form resultant oppositely disposed internal abutment projections or partitions 37 whose interior faces 38 form a continuation of the faces 29. Arched springs 40, directed towards the center of the casing, and extending beyond the vertical plane of the projections 37, have terminal looped portions 42 slidably seated in the cavities 33. The described springs cooperate with the movable member 14.

The member 14 is embodied in a plunger 44 extending loosely through an opening 45 in the lower end of the casing and includes a head 46 upon its upper end. The plunger, in this instance, is supported by the axle 8 to which is fixed by clevises or straps 48 a lateral extension 49, adjacent the saddle block 50 of the spring 9. As herein shown a ball 52 upon the lower end of the plunger is loosely seated in a semispherical socket plate 53 provided with a hole 54 to loosely receive the plunger, and attached to the extension 49 by screws 55. The described support and attachment of the plunger is not exclusive. The sides of the head 46 are concaved to receive the intermediate portions of longitudinally curved flat springs 57 which are fixed to the head by a transverse pin or double headed rivet 59 and project above and below the head 46. The vertically disposed strips 57, because of their arcuate outline form outwardly directed or diverging arms or end portions 61, contacting with the inner portions of the bearing faces 29 of the casing when the plunger is in neutral position, as shown in Figure 2, and have terminal loops or return bends 62 forming resultant inwardly directed converging fingers 63, whose bent extremities 64 are normally preferably spaced apart. The lower loops 62 at their extremities embrace the shank of the plunger 14. The radii of the spring strips 57 are less than those of the springs 40 when the parts are in neutral position.

In operation, when a severe shock is imparted to the axle because of the inequality of the road, or when a sharp recoil of the frame towards the axle occurs, the plunger head 46 has a tendency to move upwardly or downwardly from its neutral central position relatively to the casing. These reciprocations in either direction are cushioned, and the shocks of the blows and recoils are absorbed, thus. In Figure 3 the plunger is shown, for illustrative purposes, at an extreme elevated position relatively to the casing, an extreme which would seldom or ever be reached. In the movement of the head 46 from neutral position the upper ends of the members 57 as they slide along the converging bearing faces 29 meet progressively increasing resistance, and the terminal portions 64 of the spring loops 62, under more excessive strain, contact with each other and thus contribute further resistance to the advance of the head. Meanwhile yielding resistance to the advance of the plunger has been constantly exercised since the inception of its movement. This is because the arched springs 40 are in the path of the lower diverging ends of the members 57, and thus afford a gradually increasing yielding resistance to the latter in their passage over the former. This resistance is amplified by the complementary progressively increasing resistance afforded by the gradual compression of the lower loops 62. There is thus no positive stop throughout the described movement to occasion fracture of any part. An extreme opposite position of the plunger relatively to the casing is shown in broken lines in Figure 3, and the operation of the parts in reaching such position from the neutral position is the same, except as to vertical direction, as that already described.

I claim:—

1. In a shock absorber of the type set forth, a casing comprising two sets of inclined walls extending in opposite directions, a plunger, a pair of springs upon the plunger for sliding engagement with the walls, and a pair of springs supported by the walls in the path of the springs.

2. In a shock absorber of the type set forth, a casing comprising oppositely disposed inclined walls, a plunger, longitudinally disposed laterally diverging springs upon the plunger adapted to engage the walls, and arched springs supported by the walls in the path of the diverging springs.

3. In a shock absorber of the type set forth, side walls comprising parallel intermediate portions and converging end portions, said intermediate portions being provided with spaced cavities, an arched spring slidably seated in the cavities, a reciprocable plunger movable between the walls, and springs carried by the plunger engageable with the converging portions of the walls and with the arched springs.

4. In a shock absorber of the type set forth, side walls comprising intermediate portions, and two sets of inclined end portions, springs in the intermediate portions, a plunger movable between the walls, springs upon the plunger adapted to simultaneously engage the first springs and one set of the inclined portions of the walls.

5. In a shock absorber of the type set forth, side walls comprising intermediate portions and converging end portions, inwardly directed arched springs vertically disposed upon the intermediate portions of the walls, a plunger in the casing movable between the springs and the converging portions of the walls, two oppositely disposed outwardly extending arcuate springs fixed at intermediate portions to the plunger adapted to engage the first mentioned springs and the converging wall portions, and inwardly directed compressible loops integral with both ends of the second mentioned springs.

6. In a shock absorber of the type set forth, a fixed casing comprising side walls, intermediate portions and converging end portions, a plunger, longitudinally-disposed laterally-diverging springs upon the plunger adapted to engage the end portions of said casing, and frictional means projecting inwardly from the intermediate portions of said fixed casing into the path of the springs and in contact therewith for compressing the springs.

7. In a shock absorber of the type set forth, side walls comprising intermediate portions and two sets of converging end portions, the convergence of one set being disposed oppositely to that of the other set, a plunger, longitudinally-disposed laterally divergent inherently resilient means fixed intermediate the length thereof to the plunger and adapted to engage the end portions, and inwardly-directed resisting means upon the intermediate portions of the side walls in the path of the ends of the said resilient means.

In testimony whereof I have affixed my signature.

SHEFFIELD SMITH.